›United States Patent Office 3,743,728
Patented July 3, 1973

3,743,728
INSECTICIDAL ACTIVE COMPOSITION AND PROCESS FOR MANUFACTURING THE SAME
Llewellyn W. Fancher, Orinda, Calif., assignor to Stauffer Chemical Company, New York, N.Y.
No Drawing. Filed Nov. 5, 1970, Ser. No. 87,333
Int. Cl. C07d 27/52
U.S. Cl. 424—200                                         4 Claims

ABSTRACT OF THE DISCLOSURE

A process of manufacturing a liquid pesticidal active compound is described herein. The process involves the reaction of a mixture of lower aliphatic alcohols with phosphorus pentasulfide to form a mixture of dithiophosphoric acids. These acids or their salts are then reacted with N-chloromethyl phthalimide to produce a liquid mixture of products having pesticidally active properties.

BACKGROUND OF THE INVENTION

Among the several commercially available insecticides, the phthalimidomethyl monothio and dithiophosphates are notably successful, particularly S-phthalimidomethyl-O,O-dimethyl dithiophosphate. This compound is immediately toxic to a large variety of insect pests and thus has reached a relatively high degree of commercial success. This compound is described and claimed in U.S. Pat. No. 2,767,194.

While this compound has enjoyed a relatively high degree of commercial success, the physical properties of the compound are such that the compound is difficult to apply to the habitat of the pest. The physical properties of the compound can be described as being a colorless solid having a melting point of about 72° C. and is relatively insoluble in all or most all insecticide solvent carrier systems. Due to the insoluble characteristics of this insecticidal compound, the compound is very difficult to employ in a convenient form such as emulsifiable concentrates, solutions and the like.

DESCRIPTION OF THE INVENTION

In the practice of the present invention, the solubility of the above noted insecticide compound, namely S-phthalimidomethyl-O,O-dimethyl dithiophosphate is overcome by manufacturing the same along with other analogs thereof which maintain the insecticidally active compound in a liquid state. In other words, the compounds manufactured by the present invention are a mixture of phthalimido esters which are insecticidally active, but are in a liquid state. The liquid compounds can be readily used in the form of solutions, concentrates, and the like.

The mixture of phthalimido esters of the present invention are manufactured by reacting phosphorus pentasulfide with a mixture of two different alcohols of the formula ROH and R'OH, wherein R and R' are alkyl having from 1 to 4 carbon atoms and are different, which yields a mixture of three major components as follows:

A. 

B. 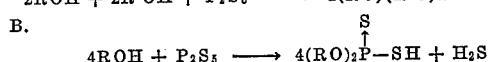

C. 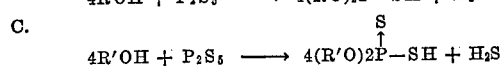

wherein R and R' are alkyl having from 1 to 4 carbon atoms and are different.

The composition of the above mixture of dithiophosphoric acids will depend primarily on the comparative reactivity of the two different alcohols and the portions used. If the above mixture of dithiophosphoric acids are neutralized with a base such as carbonate, hydroxide, amines and the like, the salt produced can be reacted with N-chloromethyl phthalimide to form a mixture of products having pesticidal properties. The reaction of N-chloromethyl phthalimide with the dithiophosphoric salt mixture can be accomplished by using a solid mixture of salts which have been isolated, or reaction may take place in a suitable solvent such as water, after neutralization of the acid with a base and removing impurities by washing with the water insoluble solvent such as benzene. Suitable reaction solvents for the formation of the mixed end products include water, alcohols, ketones, esters, hydrocarbons and mixtures thereof.

The end product of the process of the present invention will consist of three major products. These products are A. 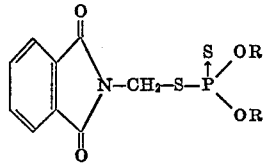

B. 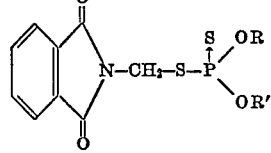

C. 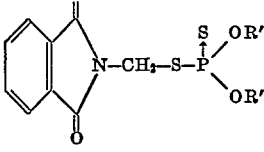

wherein R is alkyl having from 1 to 4 carbon atoms and R' is alkyl having from 1 to 4 carbon atoms, provided that R and R' are different.

In order to illustrate the merits of the present invention, the following examples are provided.

EXAMPLE 1

Eighty-two ml. (2.0 m.) of methanol were mixed with 149 ml. (2.0 m.) of n-propyl alcohol and this mixture was then added to a refluxing mixture of 220 g. (1.0 m.) of phosphorus pentasulfide and 150 ml. of benzene over one hour and ten minutes. The mixture was stirred and refluxed for 7.5 hours and then neutralized with 238 g. (1.7 m.) of anhydrous potassium carbonate. After standing overnight, the solid was filtered off, washed with benzene, and slurried in warm acetone and filtered to remove excess $K_2CO_3$. The filtrate was evaporated to a low volume and the mixture of salts precipitated by adding petroleum ether. After cooling, the salt mixture was filtered off and washed with petroleum ether to yield 353 g. This salt mixture was used without further purification in the following condensation.

Sixty-seven and three-tenths (67.3) grams of the preceding salt mixture were dissolved in 60 ml. of water. 39.1 g. of N-chloromethyl phthalimide and 200 ml. of benzene were added and the mixture stirred and refluxed for 2 hours, cooled and the water layer removed. The benzene layer was washed twice with water, dried over anhydrous magnesium sulfate, filtered and the benzene removed on the steam bath with air. The viscous liquid product weighed 66.4 g.

Analysis                                          Percent by weight
S-phthalimidomethyl-O,O-dimethyl dithiophosphate ............................................. 16.0
S - phthalimidomethyl-O,O-methyl-n-propyldithiosphate ............................................. 56.3
S - phthalimidomethyl-O,O-di-n-propyldithiophosphate ............................................. 27.7

EXAMPLE II

Thirty and four-tenths (30.4) ml. (0.75 m.) of methanol were mixed with nineteen ml. (0.25 m.) of n-propyl alcohol and cooled below 15° C. and 44.4 g. (0.2 m.) of phosphorus pentasulfide were added all at once. The stirred mixture was allowed to reach 35° C. and maintained at 35–40° C. for 15 minutes. The mixture was stirred and heated at 50–55° C. for one hour, cooled and neutralized below 20° C. with a solution of 50 ml. of water and 22 ml. of 50% sodium hydroxide. The pH was adjusted to 7.0–7.5 with 50% sodium hydroxide. The solution was washed with 50 ml. of benzene, followed by 50 ml. of n-hexane and adjusted to pH 6.5–7.0 with glacial acetic acid. This salt mixture was used without purification in the following condensation.

Forty-eight and nine-tenths (48.9) grams (0.25 m.) of N-chloromethyl phthalimide were dissolved in 200 ml. of benzene, warmed to 45° C. To this stirred solution was added the preceding dithiophosphoric acid salt solution. Any change in pH toward the acid side was off-set with a few drops of 50% NaOH to maintain pH of 6.5–7.0. The mixture was stirred and refluxed for 1 hour and 15 minutes, cooled and additional water and benzene added, the aqueous phase was separated and discarded. The benzene phase was washed twice with 200 ml. of water, dried over anhydrous magnesium sulfate, filtered and evaporated to give 86.2 g. of liquid product.

Analysis:                                         Percent by weight
S-phthalimidomethyl-O,O-dimethyl dithiophosphate ............................................. 42.3
S - phthalimidomethyl-O,O-methyl-n-propyldithiophosphate ............................................. 48.3
S - phthalimidomethyl-O,O-di-n-propyldithiophosphate ............................................. 9.4

EXAMPLE III

The procedure as outline in Example I was repeated in its entirety except the amount of methanol and N-propyl alcohol was varied. The end product had the following analysis:

Analysis:                                         Percent by weight
S-phthalimidomethyl-O,O-dimethyl dithiophosphate ............................................. 20.8
S - phthalimidomethyl-O,O-methyl-n-propyldithiophosphate ............................................. 49.2
S - phthalimidomethyl-O,O-di-n-propyldithiophosphate ............................................. 25.5
Total purity ............................................. 95.5

EXAMPLE IV

The mixture of esters made in accordance with Example III, was tested for solubility. Thus, samples of the composition of Example III were obtained. One sample was stored at 68° F., another sample was stored at 32° F., another sample was stored at 0° F. and yet another sample was stored at —10° F. Prior to storage, each of the samples were seeded with solid S-phthalimidomethyl-O,O-dimethyl dithiophosphate. No change in the liquid composition or the seed crystals was observed after 30 days.

EXAMPLE V

An emulsifiable concentrate was formed from the compound made in accordance with Example III. The emulsifiable concentrate was composed of 48.7% of the mixed esters of Example III, 46.3% of a xylene range solvent and 5% of commercial emulsifier. This compound was seeded with S-phthalimidomethyl-O,O-dimethyl dithiophosphate and stored at —10° F. for 30 days. No change in the emulsifiable concentrate or the seed crystals was observed.

EXAMPLE VI

Preparation of S-phthalimidomethyl-O,O-di-n-propyldithiophosphate 126 grams (0.5 m.) potassium-di-n-propyl dithiophosphate were dissolved in 135 ml. of water and this solution was added to a solution of 88 g. (0.45 m.) of N-chloromethyl phthalimide dissolved in 450 ml. of benzene. The mixture was stirred and refluxed (73° C.) for two hours. After cooling, the bottom aqueous phase was removed and the upper product phase was washed twice with cold water, dried over anhydrous magnesium sulfate, filtered and the solvent removed under vacuum. The moderately viscous liquid product weighed 152.6 g. or 90.9% of theory. $n_D^{30}=1.6576$.

EXAMPLE VII

In order to illustrate the solubility of S-phthalimidomethyl-O,O-dimethyl dithiophosphate, a mixture of the compound of Example VI was formed by adding thereto 15% by weight of S-phthalimidomethyl-O,O-dimethyl dithiophosphate. The solution was heated and the dimethyl ester dissolved. The solution was allowed to stand and at a temperature of approximately 45° F., the solid S-phthalimidomethyl-O,O-dimethyl dithiophosphate recrystallized in the solution.

EXAMPLE VIII

Example VII was repeated in its entirety except 30% by weight of S-phthalimidomethyl-O,O-dimethyl dithiophosphate was employed. The solid material recrystallized at 95° F.

The insecticidal activity of the compounds of the present invention were evaluated in the following manner:

(I) Black Bean Aphid [*Aphis fabae* (Scop.)]

Nasturtium (Tropaeolum sp.) plants, approximately 2–3 inches tall, are transplanted into sandy loam soil in 3 inch clay pots and infested with 50–75 aphids of mixed ages. Twenty-four hour later they are sprayed, to the point of runoff, with aqueous suspensions of the toxicant. Test concentrations ranged from 0.05% to that at which 50% mortality is obtained. Mortality is recorded after 48 hours and the $LD_{50}$ values are expressed as percent active ingredient in the aqueous suspensions.

(II) Two-spotted Mite [*Tetranychus urticae* (Koch)]

Same as for the black bean aphid except that pinto beans (Phaseolus sp.) are utilized as the host plant rather than nasturtiums.

The results of these tests are tabulated below.

TABLE I

| Compound | $LC_{50}$ values in percent | |
|---|---|---|
|  | Black bean aphid | Two-spotted mite |
| 1. Emulsifiable concentrate of Example V without seed crystals | 0.0008 | 0.001 |
| 2. Compound of Example III | 0.003 | 0.003 |
| 3. S-phthalimidomethyl-O,O-dimethyl dithiophosphate of U.S. Patent No. 2,767,194 | 0.003 | 0.003 |

As can be seen from the above, the mixed esters are insecticidally active and the solid insoluble S-phthalimidomethyl-O,O-dimethyl dithiophosphate is formed in and remains in a liquid state. Generally speaking, the amount of methanol and n-propyl alcohol used in the initial reaction to manufacture the mixed esters of this invention should be selected such that the end product has 50% by weight or less of the dimethyl ester. In the event that the proportions are selected such that the dimethyl ester is present in an amount above 50% by weight in the final product, the solid dimethyl ester will crystallize on standing.

What is claimed is:

1. An insecticidal active composition consisting of a mixture of compounds corresponding to the following:

(i) 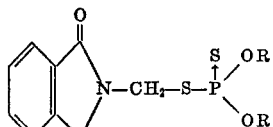

(ii) 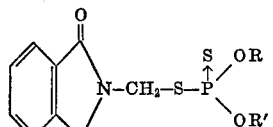

(iii) 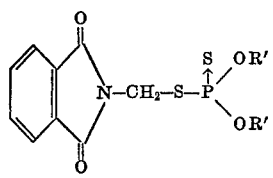

wherein R and R' are each alkyl groups having from 1 to 4 carbon atoms provided that R and R' are different alkyl groups; said mixture of compounds being manufactured by a process comprising the steps of:

(a) reacting a mixture of two alkyl alcohols of the formula ROH and R'OH wherein R and R' have been previously defined with phosphorus pentasulfide to form a mixture of dithiophosphoric acids;

(b) reacting the mixture of dithiophosphoric acids with N-chloromethyl phthalimide to produce the end product, said end product being in the liquid state, said compound defined in formula (i) is present in an amount of up to about 50% by weight.

2. The process as set forth in claim 1 wherein the two alkyl alcohols are mixed together prior to reaction with phosphorus pentasulfide.

3. The process as set forth in claim 1 wherein R is methyl and R' is n-propyl.

4. The process as set forth in claim 1 wherein the mixture of dithiophosphoric acids are converted to their respective salts prior to reaction with N-chloromethyl phthalimide.

References Cited
UNITED STATES PATENTS

| | | | |
|---|---|---|---|
| 2,767,194 | 10/1956 | Fancher | 260—326 |
| 3,401,175 | 9/1968 | Osborne et al. | 260—326 |
| 3,450,713 | 6/1969 | Tolkmith et al. | 260—326 |

JOSEPH A. NARCAVAGE, Primary Examiner

U.S. Cl. X.R.

260—326 E